March 14, 1944. A. BELDIMANO 2,344,075
APPARATUS FOR TRANSFORMING MECHANICAL ENERGY INTO HEAT
Filed March 29, 1940
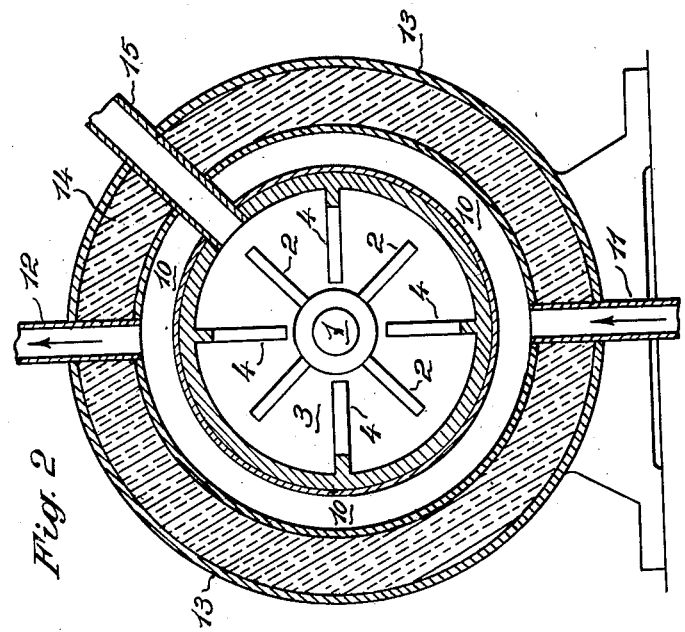
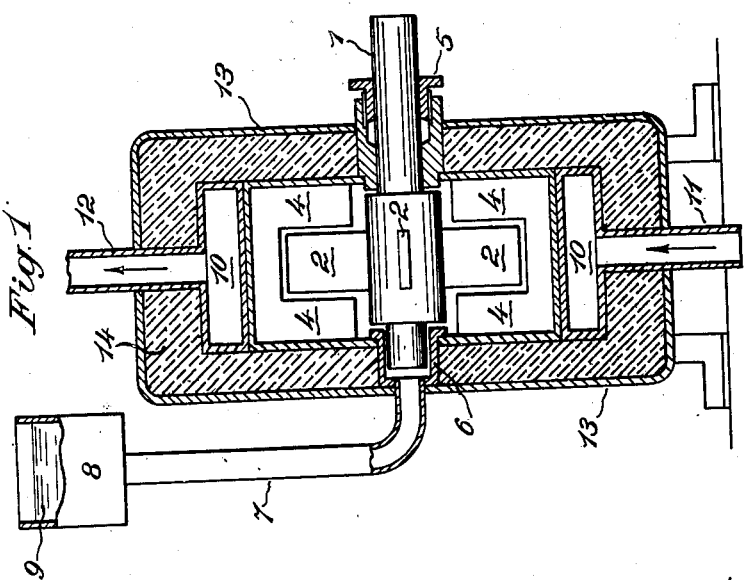
Inventor,
A. Beldimano
By Glascock Downing & Seebold
Attys.

Patented Mar. 14, 1944

2,344,075

UNITED STATES PATENT OFFICE 2,344,075

APPARATUS FOR TRANSFORMING MECHANICAL ENERGY INTO HEAT

Alessandro Beldimano, Rome, Italy; vested in the Alien Property Custodian

Application March 29, 1940, Serial No. 326,790
In Germany April 3, 1939

3 Claims. (Cl. 122—26)

The present invention relates to apparatus for transforming mechanical energy into heat energy and more specifically pertains to the structural features of such apparatus.

An object of the invention includes the provision of a plurality of blades driven by any suitable means such as a wind motor to generate heat by sufficient friction within an insulated casing.

Another object of the invention resides in providing a wind driven shaft rotatable within the insulated casing and means permitting the expansion of a liquid outwardly from the housing when the liquid is heated.

A more specific object of the invention includes the provision of a housing surrounding the casing through which a liquid may be passed in heat-exchange relationship with the casing so that the heat generated therein may be absorbed by the fluid passing within the casing.

Other objects and features of the invention will be apparent from the annexed drawing and the following detailed description wherein an exemplary embodiment of the invention is disclosed.

In the drawing:

Fig. 1 is an axial sectional view of the apparatus embodying the invention.

Fig. 2 is a transverse sectional view of the apparatus shown in Fig. 1.

Referring to the drawing there is shown at 1 a shaft adapted to be driven by any suitable mechanical means (not shown). The shaft 1 may for example be driven by a wind motor. The shaft 1 is journaled for rotation within a drum 3 by means of suitable bearings 5 and 6. The drum 3 is adapted to receive a supply of liquid such as oil. The bearing 5 is therefore suitably sealed to prevent escape of liquid along the shaft 1 through the bearing 5. The bearing 6 is provided with a tube 7 which extends upwardly therefrom into which the liquid within the drum 3 may expand when heated. The tube 7 is also provided with a receptacle 8 for storing a surplus of the liquid 9 therein.

The shaft 1 is provided with a plurality of radially arranged blades 2 and these blades may be secured in any suitable manner to the shaft so as to be rotated thereby. The apparatus includes a plurality of fixed blades 4 suitably mounted within the drum 3. The fixed blades 4 are provided with aligned openings through which the blades 2 may rotate. Thus the liquid or oil within the drum 3 is agitated and tends to be rotated by the blades 2 and the tendency of the liquid to rotate within the drum 3 is substantially prevented by means of the blades 4. The friction thus created generates heat within the drum 3 and the heat is distributed throughout the liquid within the drum 3.

The drum 3 is preferably of cylindrical shape and surrounded by a casing 10 in heat-exchange relationship with the drum 3. Liquid such as water may be guided into the casing 10 by means of a pipe 11 and the liquid is discharged from the casing 10 by means of a pipe 12. Thus the liquid passing through the casing absorbs heat from the oil within the drum 3 whereby the heat of the liquid passing through the casing 10 may be discharged through the pipe 12 to a point of use.

The drum 3 and the casing 10 are covered by means of suitable heat insulating material 14. The heat insulating material is also covered by means of an envelope 13.

A pipe 15 is provided for introducing the liquid or oil into the drum 3.

While the invention has been described with reference to specific structural details it will be appreciated that changes may be made therein by those skilled in the art. Such modifications may be made without departing from the spirit and scope of the invention as set forth in the appended claims.

I claim:

1. Apparatus for transforming mechanical energy into heat energy comprising, a drum, a driven shaft rotatable in said drum, radial blades carried by the shaft within the drum, stationary blades within the drum having openings through which the radial blades move, a supply of liquid within the drum heated by agitation of the liquid by said blades, and means guiding a liquid along said drum in heat-exchange relationship therewith for withdrawing the heat from the drum.

2. Apparatus for transforming mechanical energy into heat energy comprising, a cylindrical-shaped drum, a driven shaft arranged axially of and journaled in the drum, radial blades mounted on the shaft for rotation within the drum, radial blades secured within the drum, a supply of oil filling the drum, a tube extending upwardly from the drum into which oil from the drum may expand, a casing embracing the periphery of the drum in heat-exchange relationship with the drum, a pipe for directing a liquid into the casing, a pipe for discharging liquid from the casing, and heat insulating means surrounding the drum and the casing.

3. Apparatus for transforming mechanical energy into heat energy comprising, a cylindrical drum, a driven shaft arranged axially of the drum, bearings in the drum supporting the shaft for rotation therein, radial blades fixed to the shaft within the drum, radial blades fixed within the drum, a supply of oil filling the drum, means preventing the escape of oil from the drum through one bearing, a tube extending upwardly from the other bearing into which oil from the drum may expand, a casing embracing the periphery of the drum in heat-exchange relationship therewith, a pipe for directing a liquid into the casing, a pipe for discharging liquid from the casing, and heat insulating means surrounding the drum and the casing.

ALESSANDRO BELDIMANO.